(12) United States Patent  (10) Patent No.: US 7,525,474 B2
Carocari et al.  (45) Date of Patent: Apr. 28, 2009

(54) INTEGRATED DISTANCE MEASURING EQUIPMENT AND TRANSPONDER SYSTEM AND METHOD

(75) Inventors: John B. Carocari, Overland Park, KS (US); Showkat Osman, Overland Park, KS (US)

(73) Assignee: Honeywell International Inc., Morristown, NJ (US)

( * ) Notice: Subject to any disclaimer, the term of this patent is extended or adjusted under 35 U.S.C. 154(b) by 171 days.

(21) Appl. No.: 11/694,690

(22) Filed: Mar. 30, 2007

(65) Prior Publication Data

US 2008/0238759 A1 Oct. 2, 2008

(51) Int. Cl.
G01S 13/76 (2006.01)
(52) U.S. Cl. .......................................... 342/47; 342/30
(58) Field of Classification Search .................... 342/29, 342/30, 32–37, 42–47, 51
See application file for complete search history.

(56) References Cited

U.S. PATENT DOCUMENTS 4,658,359 A    4/1987  Palatucci et al.
5,212,813 A    5/1993  Renaud
6,072,994 A    6/2000  Phillips et al.
2006/0252382 A1  11/2006  Campbell
2008/0068250 A1*  3/2008  Brandao et al. ............... 342/30
2008/0238759 A1*  10/2008  Carocari et al. ............... 342/47

FOREIGN PATENT DOCUMENTS

EP    1901087 A1    3/2008
FR    2621133 A  *  3/1989
GB    2062395 A  *  5/1981
WO    WO00/57204 A2    9/2000

OTHER PUBLICATIONS

Long; Coaxial Switch Technology for Collision Avoidance Systems; Microwave Journal; Dec. 1, 1991; pp. 96, 98, 100; vol. 34 No. 12; Horizon House Publication; Norwood, MA, US.

* cited by examiner

*Primary Examiner*—John B Sotomayor
(74) *Attorney, Agent, or Firm*—Black Lowe & Graham PLLC (57) ABSTRACT

A combined transponder and DME system for use in an aircraft. An L Band transmitter is shared between transponder and DME.

15 Claims, 7 Drawing Sheets

INTEGRATED DISTANCE MEASURING EQUIPMENT AND TRANSPONDER SYSTEM AND METHOD

BACKGROUND OF THE INVENTION

Current transponder and distance measuring equipment (DME) systems for use in aircraft typically require their own transmitters and antennas. This results in considerable total system weight, requires extensive coaxial cabling, and is expensive. Accordingly, there is a need to reduce the number of antennas and transmitters required on aircraft equipped with transponders and DMEs as well as to minimize the combined weight and cost of the systems.

SUMMARY OF THE INVENTION

An example embodiment of the invention combines various functions of transponder and DME systems for use in an aircraft into a single unit. By so doing, one of the most expensive modules of each of the two systems, the L Band transmitter, can be shared between them rather than having each system contain its own transmitter. Further, combining the two functions within a single line replaceable unit (LRU), allows for implementations that in some instances permit the use of a single antenna for both functions without the RF power loss that would be present if two conventional systems shared the same antenna simultaneously. This sharing of a single antenna allows all RF input/output (I/O) to take place over a single coaxial cable which can provide a significant cost advantage.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
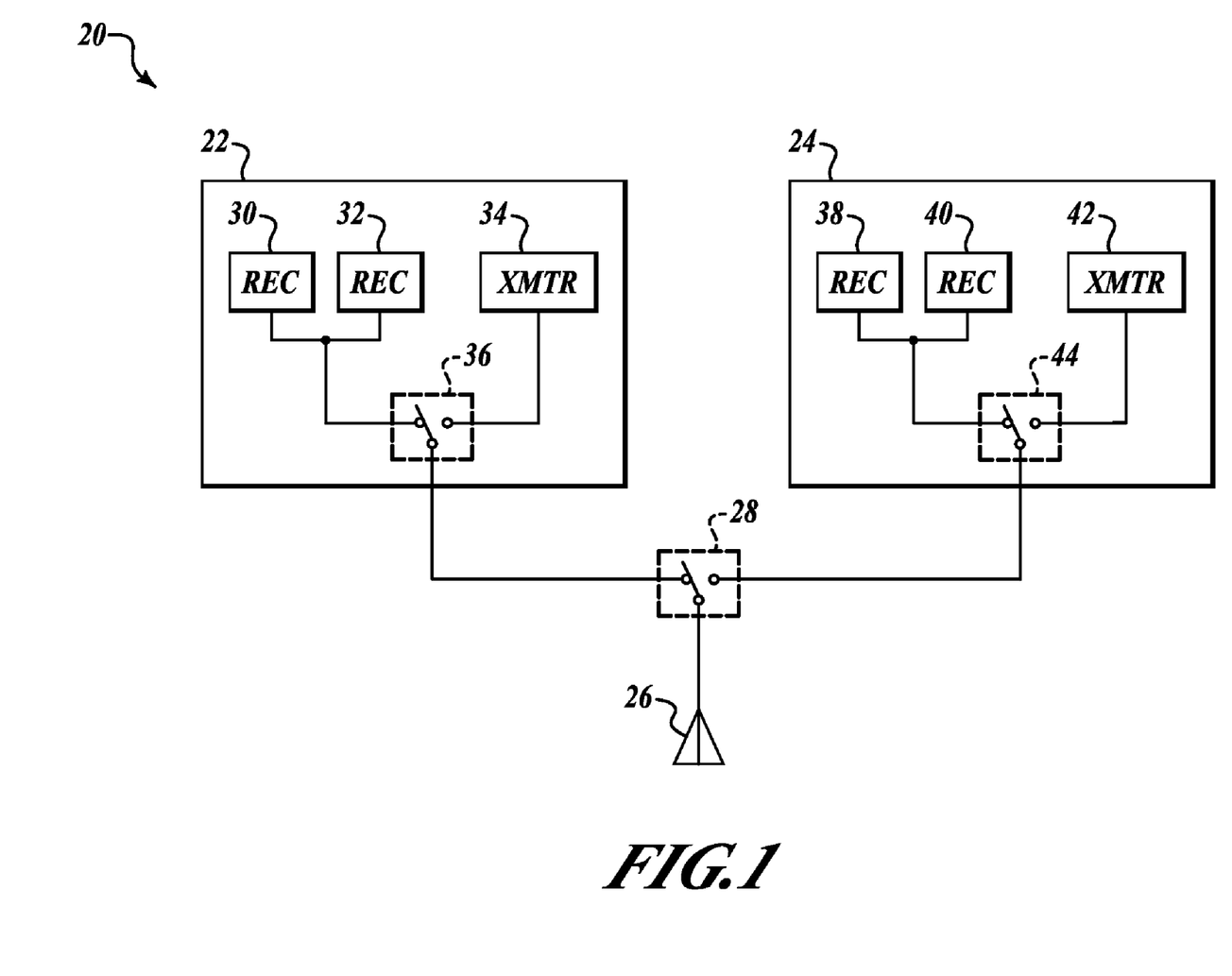
FIG. 1 is a high-level block diagram of a dual installation of combined transponder and DME systems formed in accordance with an embodiment of the invention.

FIG. 1 is a block diagram of a combined transponder (XPDR) and distance measuring equipment (DME) system 20 for use in an aircraft formed in accordance with an embodiment of the invention. In an example embodiment, the system 20 is a redundant system that includes a first line replaceable unit (LRU) 22 and a second LRU 24 that are connected to an antenna 26 through an LRU1/LRU2 switch 28. In an example embodiment, the antenna 26 is an L-band blade antenna. Each LRU 22 and 24 includes an integrated DME and XPDR transceiver system. The first LRU 22 includes a receiving path having a first receiver 30 and a second receiver 32. The first LRU 22 also includes a transmitter 34 linked to a TX/RX switch 36 that selectively connects either the transmitter 34 or the receivers 30 and 32 to a first lead of the LRU1/LRU2 switch 28.

In similar fashion, the second LRU 24 includes a receiving path having a first receiver 38 and a second receiver 40. The second LRU 24 also includes a transmitter 42 connected to a TX/RX switch 44 that selectively connects either the transmitter 42 or the receivers 38 and 40 to a second lead of the LRU1/LRU2 switch 28. In an example embodiment, the LRU1/LRU2 switch 28 is controlled by a pilot or other user of the system 20 so that should one of the LRUs 22 or 24 fail, the pilot is able to switch to the other LRU. However, in other embodiments, the switch 28 is controlled automatically by a failure detection system (not shown) that switches from a failed LRU to an operable LRU when a failure is detected.

Figure 2:
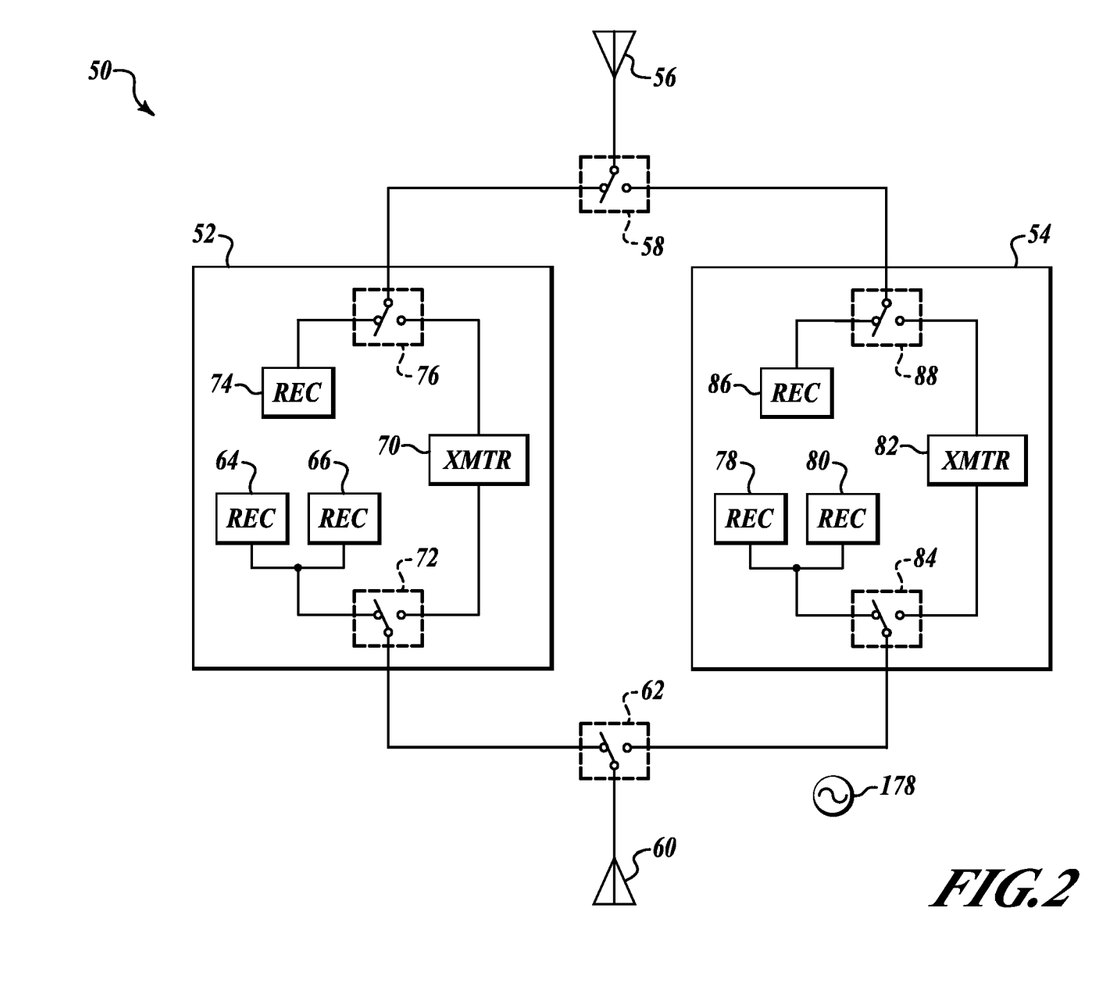
FIG. 2 is a high-level block diagram of a dual installation of combined diversity transponder and DME systems formed in accordance with an alternate embodiment of the invention.

FIG. 2 is a block diagram of a combined transponder and DME system 50 formed in accordance with an alternative embodiment of the invention. The system 50 includes a first LRU 52 and a second LRU 54 connected to a first antenna 56 through a first LRU1/LRU2 switch 58. Each LRU 52 and 54 includes an integrated XPDR and DME transceiver system. The first LRU 52 and the second LRU 54 are also connected to a second antenna 60 through a second LRU1/LRU2 switch 62. In an example embodiment, the first antenna 56 is located on the top of an aircraft and the second antenna 60 is located on the bottom of the aircraft. The LRU1/LRU2 switches 58 and 62 selectively connect either the first LRU 52 or the second LRU 54 to the antennas 56 and 60 respectively.

The first LRU 52 includes a receiving path having a first receiver 64 and a second receiver 66 connected to one lead of a first TX/RX switch 72. The first LRU 52 also includes a third receiver 74 connected to a first lead of a second TX/RX switch 76. The first LRU 52 also includes a transmitter 70, connected both to a second lead of the first TX/RX switch 72 and to a second lead of the second TX/RX switch 76. The first TX/RX switch 72 selectively connects either the receiving path having the two receivers 64 and 66 or the transmitter 70 to a first lead of the second LRU1/LRU2 switch 62 and the second TX/RX switch 76 selectively connects either the third receiver 74 or the transmitter 70 to a first lead of the first LRU1/LRU2 switch 58.

In similar fashion, the second LRU 54 includes a receiving path having a first receiver 78 and a second receiver 80, and also includes a transmitter 82. The receiving path having the first receiver 78 and the second receiver 80 is connected to a first lead of a first TX/RX switch 84 and the transmitter 82 is connected to a second lead of the first TX/RX switch 84. The second LRU 54 also includes a third receiver 86 that is connected to a first lead of a second TX/RX switch 88. The transmitter 82 is also connected to a second lead of the second TX/RX switch 88. The first TX/RX switch 84 selectively connects either the receiving path having the two receivers 78 and 80 or the transmitter 82 to a second lead of the second LRU1/LRU2 switch 62, and the second TX/RX switch 88 selectively connects either the third receiver 86 or the transmitter 82 to a second lead of the first LRU1/LRU2 switch 58. In an example embodiment, the LRU1/LRU2 switches 58 and 62 are controlled by a pilot or other user of the system 50 so that should one of the LRUs 52 or 54 fail, the pilot is able to switch to the other LRU. However, in other embodiments, the switches 58 and 62 are controlled automatically by a failure detection system (not shown) that switches from a failed LRU to an operable LRU when a failure is detected.

Figure 3:
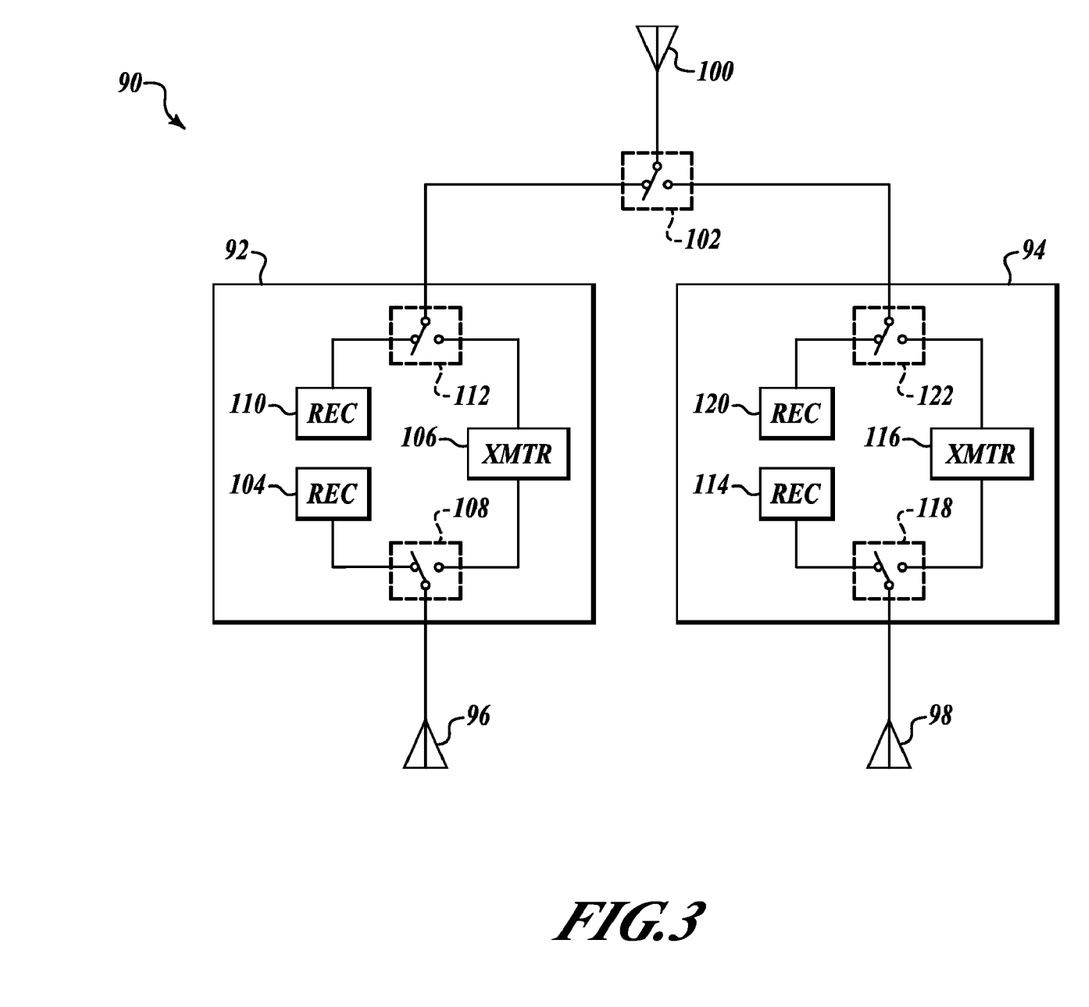
FIG. 3 is a high-level block diagram of a dual installation of combined diversity transponder and DME systems formed in accordance with an additional embodiment of the invention.

FIG. 3 is a block diagram of a combined transponder and DME system 90 formed in accordance with an additional embodiment of the invention. The system 90 includes a first LRU 92 and a second LRU 94. Each LRU 92 and 94 includes an integrated DME and XPDR transceiver system. The first LRU 92 is connected to a first antenna 96, and the second LRU 94 is connected to a second antenna 98. The first antenna 96 and the second antenna 98 are each attached to only a single LRU 92 and 94 respectively. The first LRU 92 and the second LRU 94 are also connected to a third antenna 100 through an LRU1/LRU2 switch 102. The LRU1/LRU2 switch 102 selectively connects either the first LRU 92 or the second LRU 94 to the third antenna 100. In an example embodiment, the first antenna 96 and the second antenna 98 are located on the bottom of the aircraft and the third antenna 100 is located on the top of the aircraft.

The first LRU 92 includes a first receiver 104 connected to a first lead of a first TX/RX switch 108 and a transmitter 106 connected to a second lead of the first TX/RX switch 108. The TX/RX switch 108 selectively connects either the first receiver 104 or the transmitter 106 to the antenna 96. The first LRU 92 also includes a second receiver 110 connected to a first lead of a second TX/RX switch 112, with the transmitter 106 being connected to a second lead of the switch 112. The switch 112 selectively connects either the receiver 110 or the transmitter 106 to a first lead of the LRU1/LRU2 switch 102.

In similar fashion, the second LRU 94 includes a first receiver 114 connected to a first lead of a first TX/RX switch 118 and a transmitter 116 connected to a second lead of the TX/RX switch 118. The TX/RX switch 118 selectively connects either the first receiver 114 or the transmitter 116 to the second antenna 98. The second LRU 94 also includes a second receiver 120 connected to a first lead of a second TX/RX switch 122, with the transmitter 116 being connected to a second lead of the TX/RX switch 122. The TX/RX switch 122 selectively connects either the second receiver 120 or the transmitter 116 to a second lead of the LRU1/LRU2 switch 102.

In an example embodiment, each of the LRUs 92 and 94 are operable only as a DME or a XPDR at a given time and the LRU1/LRU2 switch 102 is controlled by a pilot or other user of the system 90 so that should one of the LRUs 92 or 94 fail, the pilot is able to switch to the other LRU. However, in other embodiments, the switch 102 is controlled automatically by a failure detection system (not shown) that switches from a failed LRU to an operable LRU when a failure is detected. In an example embodiment, the pilot is also able to control whether the LRUs 92 and 94 function as a DME or a XPDR.

Figure 4:
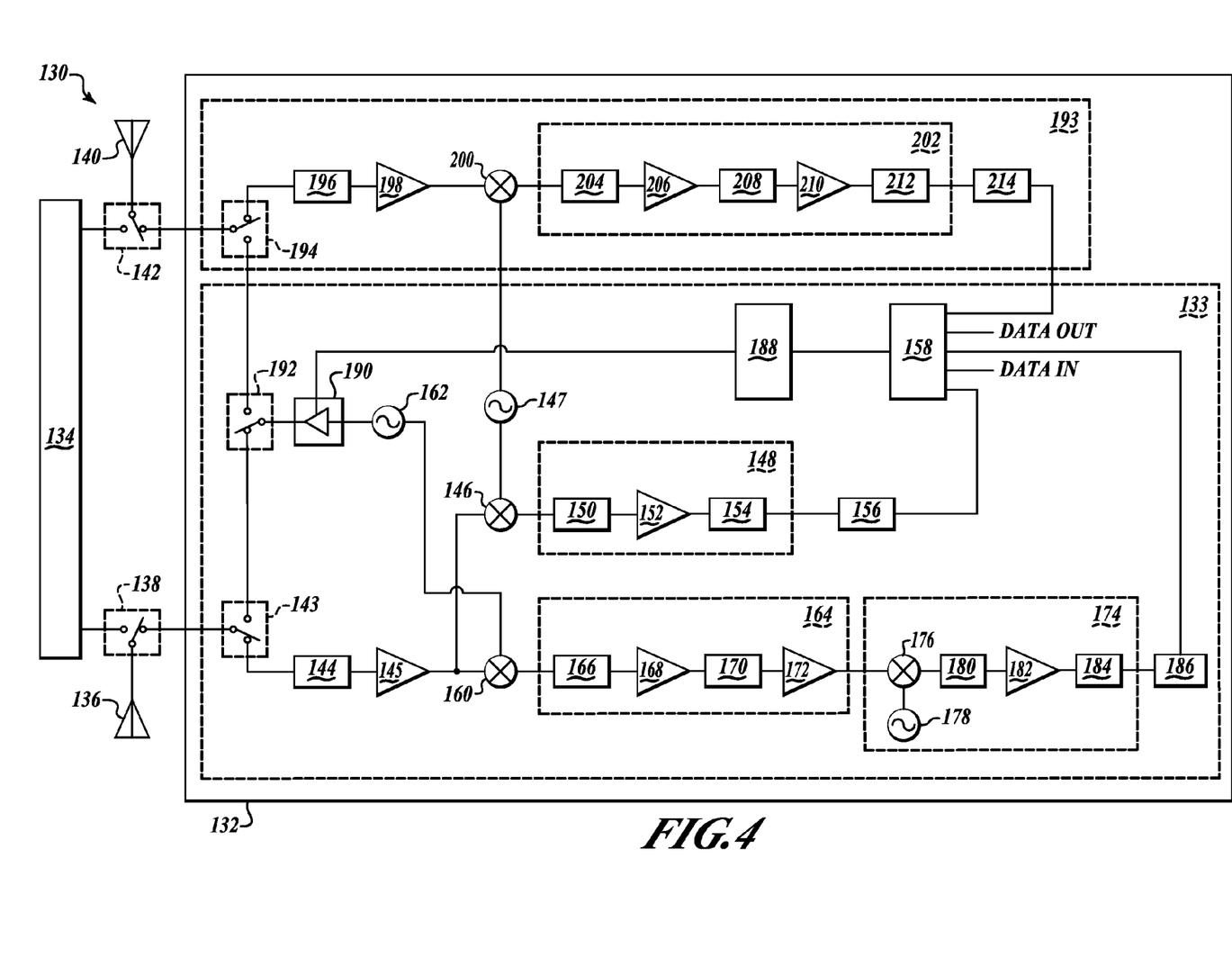
FIG. 4 is a block diagram showing additional detail for embodiments of the invention corresponding to the transponder and DME systems shown in FIGS. 1 and 2 using an analog implementation.

FIG. 4 is a block diagram of a combined transponder and DME system 130 formed in accordance with an example embodiment of the invention. In similar fashion to the systems 20 and 50 shown in FIGS. 1 and 2, the system 130 is a redundant transponder and DME system having a first LRU 132 and a second LRU 134. In example embodiments, aspects of the system 130 correspond to more detailed analog implementations of the systems 20, 50 shown in FIGS. 1 and 2. Although the details of only one LRU are shown within the system 130, it should be understood that the details of LRU 134 are similar to the details of LRU 132 in an example embodiment. The first LRU 132 and the second LRU 134 are selectively connected to a first antenna 136 using a first LRU1/LRU2 switch 138. The first LRU 132 and the second LRU 134 are also selectively connected to a second antenna 140 using a second LRU1/LRU2 switch 142. In an example embodiment, the first antenna 136 is located on the bottom of an aircraft and the second antenna 140 is located on the top of the aircraft. In an example embodiment, the LRU1/LRU2 switches 138 and 142 are controlled by a pilot or other user of the system 130 so that should one of the LRUs 132 or 134 fail, the pilot is able to switch to the other LRU. However, in other embodiments, the switches 138 and 142 are controlled automatically by a failure detection system (not shown) that switches from a failed LRU to an operable LRU when a failure is detected.

The first LRU 132 includes a first TX/RX switch 143 for determining whether a receiving path or a transmitter of the LRU 132 is connected to the first antenna 136 at a given time. When the first TX/RX switch 143 is connected to receive, the first LRU1/LRU2 switch 138 and the first TX/RX switch 143 are set to send the received signal to a preselector 144 that is configured to allow transponder and DME frequencies to continue in the receiving path. The preselector 144 may be constructed of a low pass filter, a bandpass filter, or a specialized microelectromechanical system (MEMS) device, for example. After passing through the preselector 144, the signal passes through a gain stage 145. In an example embodiment, the gain stage 145 includes a low noise amplifier. Following the gain stage 145, the signal is split into a first receiver and a second receiver, with each being used to receive signals in particular frequency ranges. In an example embodiment, the first receiver is used for receiving transponder interrogation frequencies and the second receiver is used for receiving DME frequencies. Transponder interrogation frequencies are typically received at 1030 megahertz (MHz) and DME replies from a ground station are typically received in a frequency range from 962 to 1213 MHz. However, other frequencies may be used.

In the first receiver, the signal passes next through a first mixer 146 that is driven by a first oscillator 147. The signal then passes through a filtering and amplification stage 148 that may be formed of one or more filters and gain stages. In an example embodiment, the filtering and amplification stage 148 includes a low pass filter 150 followed by a gain stage 152 and a bandpass filter 154. After passing through the filtering and amplification stage 148, the signal passes through an amplifier 156 before entering a logic circuit component 158. In an embodiment, the amplifier 156 is a logarithmic amplifier. In an example embodiment, the logic circuit component 158 includes a DATA IN line and a DATA OUT line that are used to send control signals to and receive status signals from various components controlled by the logic circuit component 158. The DATA IN and DATA OUT lines are also used to communicate with other systems (not shown) in some embodiments.

In the second receiver following the gain stage 145, the signal passes through a second mixer 160 that is driven by a variable frequency oscillator 162. The signal then passes through a filtering and amplification stage 164 that may include one or more filters and gain stages. In an example embodiment, the filtering and amplification stage 164 includes a low pass filter 166, a first gain stage 168, a bandpass filter 170, and a second gain stage 172. Following the filtration and amplification stage 164, the signal passes through an additional mix down, filtering, and amplification stage 174. The stage 174 begins with a third mixer 176 that is driven by a third oscillator 178. After passing through the third mixer 176, the signal next passes through a low pass filter 180, a gain stage 182, and a bandpass filter 184 in an example embodiment. After the stage 174, the signal passes through an amplifier 186, a logarithmic amplifier, before entering the logic circuit component 158. A modulator 188 is in signal communication with the logic circuit component 158 and also with a transmitter 190 that is an L-Band transmitter in an example embodiment.

The logic circuit component 158 along with the modulator 188 controls the activity of the transmitter 190 as well as performs data decoding and encoding functions. When a transponder interrogation is received, the logic circuit component 158 sends an appropriate reply sequence to the modulator 188, which in turn activates the transmitter 190. In addition, the logic circuit component 158 controls positions of the TX/RX switch 143 as well as a top/bottom switch 192 and a TX/RX switch 194 to allow proper signal flow to occur. Also, the logic circuit component 158 performs various logic functions required by DME functionality of the LRU 132, including initiating interrogations, listening for ground stations, and decoding station identification data. An additional function of the logic circuit component 158 is to establish priorities for the transmitter 190. When a XPDR interrogation is received, generation of the reply is given priority over all DME functions in an example embodiment.

Transponder response signals are typically transmitted at 1090 MHz and DME interrogations are typically transmitted in a range from 1025 to 1150 MHz, however, other frequencies may be used. The transmitter 190 receives a signal from the variable frequency oscillator 162. The transmitter 190 is connected via the top/bottom switch 192 to either the first antenna 136 or the second antenna 140 via the TX/RX switches 143 or 194 respectively and the LRU1/LRU2 switches 138 or 142 respectively. If the first TX/RX switch 143 is switched to the transmission side rather than the receiving side, and the transmitter 190 is connected to the TX/RX switch 143 via the top/bottom switch 192, signals will be transmitted through the first antenna 136 provided the switch 138 is switched to the first LRU 132.

An example embodiment corresponding to the system 20 in FIG. 1 is shown by a portion of FIG. 4 that includes the first antenna 136, the first LRU1/LRU2 switch 138 and the box 133. The second antenna 140, the second LRU1/LRU2 switch 142, and a third receiver 193 are not included in this example embodiment corresponding to the system 20 of FIG. 1. A box similar to the box 133 would also be present in the second LRU 134.

In an example embodiment corresponding to the system 50 in FIG. 2, the third receiver 193, the second antenna 140 and the second switch 142 are also included. The third receiver 193 is similar to the first receiver that includes the preselector 144, the gain stage 145, the first mixer 146, the filtering and amplification stage 148 and the amplifier 156. Additional components in the third receiver 193 include a second TX/RX switch 194 that may be selectively connected to a path that leads to either the transmitter 190 or to a preselector 196. The preselector 196 is configured to receive signals having a frequency range that correspond to transponder interrogation signals. If a signal is received and passes through the preselector 196, the signal next travels through a gain stage 198 that may be a low noise amplifier, for example. Then, the signal passes through a mixer 200 that is driven by the oscillator 147. Next, the signal passes through a filtering and amplification stage 202. In an example embodiment, the filtering and amplification stage 202 includes a low pass filter 204 followed by a first gain stage 206 and a bandpass filter 208, which is then followed by an additional gain stage 210 followed by a second bandpass filter 212. The filtering and amplification stage 202 is then followed by a logarithmic amplifier 214 before the signal passes into the logic circuit component 158.

The third receiver shown in the dashed box 193 is configured to receive transponder interrogation signals from the second antenna 140. The TX/RX switch 194 is also used for allowing the transmitter 190 to transmit signals using the second antenna 140 in response to transponder interrogations received through the third receiver 193.

Although the connections are not shown, the logic circuit component 158 controls the first TX/RX switch 143, the second TX/RX switch 194, and the top/bottom switch 192 in an example embodiment. Additionally, the logic circuit component 158 controls the frequency of the variable frequency oscillator 162. In this way, the logic circuit component 158 determines whether transponder or DME signals are being transmitted and received as well as the proper antenna to use.

In an example embodiment, the first LRU1/LRU2 switch 138 and the second LRU1/LRU2 switch 142 remain connected to the first LRU 132 unless the first LRU 132 exhibits at least one predetermined failure condition, at which point the switches 138 and 142 change connection to the second LRU 134, allowing it to perform transponder and DME transmitting and receiving functions that were previously handled by the first LRU 132.

Figure 5:
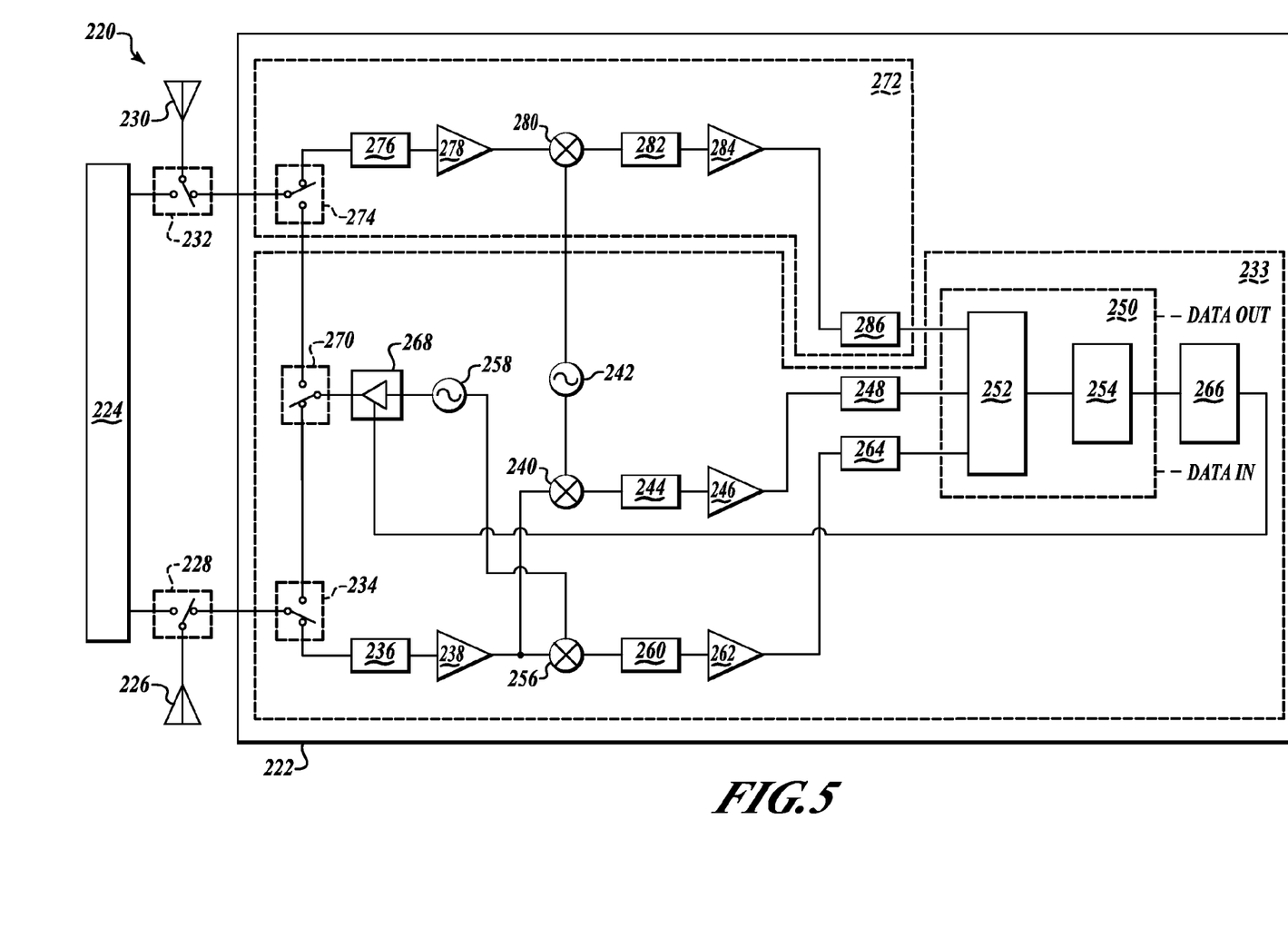
FIG. 5 is a block diagram showing additional detail for alternate embodiments of the invention corresponding to the transponder and DME systems shown in FIGS. 1 and 2 using a digital implementation.

FIG. 5 is a block diagram of a combined transponder and DME system 220 formed in accordance with an embodiment of the invention. In example embodiments, aspects of the system 220 correspond to more detailed digital implementations of the systems 20 and 50 shown in FIGS. 1 and 2. The system 220 includes a first LRU 222 and a second LRU 224 selectively connected to a first antenna 226 using a first LRU1/LRU2 switch 228. The LRUs 222 and 224 are also selectively connected to a second antenna 230 using a second LRU1/LRU2 switch 232. In an example embodiment, the LRU1/LRU2 switches 228 and 232 are controlled by a pilot or other user of the system 220 so that should one of the LRUs 222 or 224 fail, the pilot is able to switch to the other LRU. However, in other embodiments, the switches 228 and 232 are controlled automatically by a failure detection system (not shown) that switches from a failed LRU to an operable LRU when a failure is detected.

Although the details of only one LRU are shown within the system 220, it should be understood that the details of LRU 224 are similar to the details of the LRU 222. The first LRU 222 includes a first TX/RX switch 234 for selectively connecting either a transmission path or a receiving path to the first antenna 226. When the TX/RX switch 234 is connected to the receiving path, a received signal passes through a preselector 236 before passing through a gain stage 238 that may be a low noise amplifier, for example. Following the gain stage 238, the receiving path splits into a first and a second receiver with each receiver being used to receive signals in particular frequency ranges. In an example embodiment, the first receiver is used for receiving transponder interrogation frequencies and the second receiver is used for receiving DME reply frequencies.

In the first receiver, the signal passes through a first mixer 240 that is driven by a first oscillator 242. The signal then passes through an anti-aliasing filter 244 before passing through a gain stage 246. Next, the signal passes through an analog to digital converter 248 before passing into a processing and control portion 250. In an example embodiment, the processing and control portion 250 includes a field programmable gate array (FPGA) 252 and a logic circuit component 254. However, the FPGA 252 and the logic circuit component 254 can be combined in a single unit such as a digital signal processor (DSP) or an application specific integrated circuit (ASIC), or additional or alternate components could be used, such as a dedicated digital signal processor for example.

The second receiver includes a second mixer 256 that is driven by a variable frequency oscillator 258. After the signal passes through the mixer 256, it enters an anti-aliasing filter 260 before passing through a gain stage 262, and then passing into an analog to digital converter 264 before entering the processing and control unit 250. The processing and control unit 250 determines whether the received signal is a transponder interrogation signal or a DME reply signal. The processing and control unit 250 directs a modulator 266 to send appropriate response signals using a transmitter 268 based on the determined signal. The transmitter 268 transmits the signal from the modulator 266 using either the first antenna 226 or the second antenna 230 depending upon where it is directed to do so by the processing and control unit 250. The transmitter 268 is driven by the variable frequency oscillator 258.

In an example embodiment corresponding to the system 20 shown in FIG. 1, the system 220 includes the detailed components shown in a dashed box 233, the first antenna 226 and the first LRU1/LRU2 switch 228, but not the components shown in a dashed box 272, the second antenna 230 or the second LRU1/LRU2 switch 232. Similar components would also be present in the second LRU 224.

In an additional embodiment corresponding to the system 50 shown in FIG. 2, the system 220 shown in FIG. 5 also includes the detailed components shown in the dashed box 272 as well as the second antenna 230 and the second LRU1/LRU2 switch 232. The components shown in the dashed box 272 include a third receiver and a second TX/RX switch 274 that selectively switches between the third receiver and the transmitter 268. If the TX/RX switch 274 is switched to the third receiver, the signal received from the second antenna 230 passes through a preselector 276 that allows transponder interrogation frequencies to pass, and then passes through a gain stage 278 that is a low noise amplifier in an example embodiment. The signal then passes through a mixer 280 that is driven by the oscillator 242. Next, the signal passes through an anti-aliasing filter 282 before passing through a gain stage 284 and then enters an analog to digital converter 286 before entering the control and processing unit 250.

In an example embodiment, the control and processing unit 250 includes a DATA IN line and a DATA OUT line that are used to send control signals to and receive status signals from various components controlled by the control and processing unit 250. The DATA IN and DATA OUT lines are also used to communicate with other systems (not shown) in some embodiments. Although the connections are not shown, the processing and control unit 250 controls the first TX/RX switch 234, the second TX/RX switch 274, and the top/bottom switch 270 in an example embodiment. Additionally, the processing and control unit 250 controls the frequency of the variable frequency oscillator 258. In this way, the processing and control unit 250 determines whether transponder or DME signals are being transmitted and received as well as the proper antenna to use.

In some embodiments, the system 220 complies with particular standards such as those promulgated by the Radio Technical Commission for Aeronautics (RTCA). In an example embodiment, the system 220 complies with RTCA DO-181( ), "Minimum Operational Performance Standards (MOPS) For Air Traffic Control Radar Beacon System/Mode Select (ATCRBS/Mode S) Airborne Equipment" document. In an example embodiment, the system 220 also complies with other standards, such as RTCA DO-189 "Minimum Operational Performance Standards (MOPS) for Airborne Distance Measuring Equipment (DME) Operating within the Radio Frequency Range of 960-1215 Megahertz". Some embodiments of systems shown in the other figures also comply with RTCA DO-189 and DO-181( ).

Figure 6:
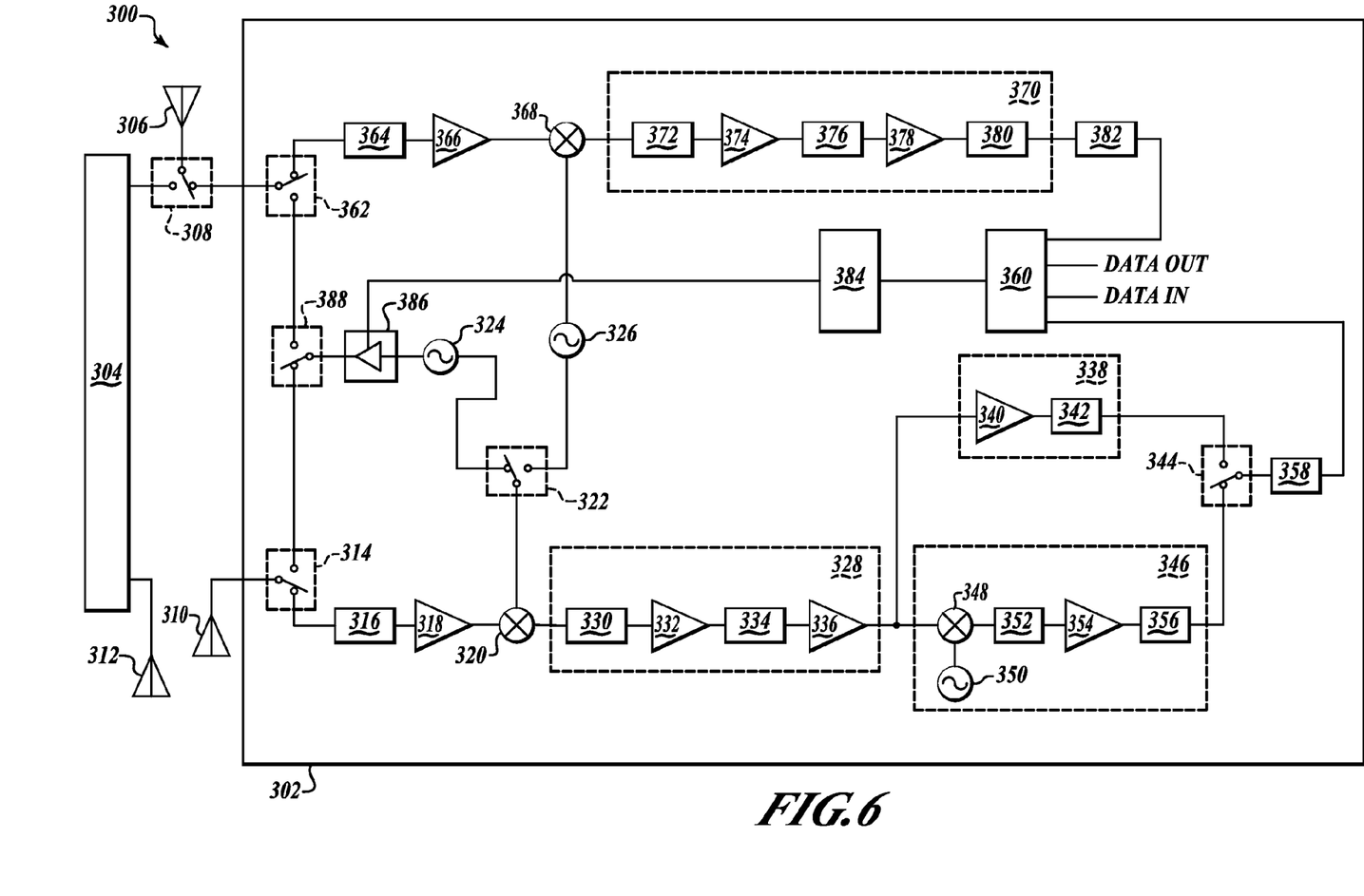
FIG. 6 is a block diagram showing additional detail for an embodiment of the invention corresponding to the transponder and DME system shown in FIG. 3 using an analog implementation.

FIG. 6 is a block diagram of a combined transponder and DME system 300 formed in accordance with an embodiment of the invention. The system 300 corresponds to a more detailed analog implementation of the system 90 shown in FIG. 3. The system 300 includes a first LRU 302 and a second LRU 304 that may be used in redundant operation. The system 300 also includes a first antenna 306 and an LRU1/LRU2 switch 308 that selectively connects the first antenna 306 to either the first LRU 302 or the second LRU 304. The first LRU 302 is connected to a second antenna 310 and the second LRU 304 is connected to a third antenna 312. The second antenna 310 is selectively connected to either a transmission path or a receiving path in the first LRU 302 using a first TX/RX switch 314.

When the TX/RX switch 314 is connected to the receiving path, a received signal passes through a preselector 316 that is configured to accept both transponder interrogation frequencies and DME reply frequencies. Next, the signal passes through a gain stage 318 that may be a low noise amplifier, for example. Then, the signal passes through a mixer 320. The mixer 320 is connected to a switch 322 that selectively connects the mixer 320 to a variable frequency oscillator 324 or a fixed oscillator 326. The variable frequency oscillator 324 is selected for receiving DME frequencies. The fixed oscillator 326 is selected for receiving transponder frequencies. Next, the signal passes through a filtering and gain stage 328. The filtering and gain stage 328 may be composed of a variety of filtering and gain stages. In the example shown, the signal first passes through a low pass filter 330 before passing through a first gain stage 332 and next passes through a bandpass filter 334 before passing through a second gain stage 336. At this point, the signal receiving path splits into a first receiver and a second receiver. The first receiver is used for the reception of transponder interrogation frequencies and the second receiver is used for the reception of DME reply frequencies.

The first receiver includes a filtering and gain stage 338. In this example embodiment, the filtering and gain stage 338 includes a gain stage 340 followed by a bandpass filter 342 that is configured to accept transponder interrogation frequencies. However, the filtering and gain stage 338 includes other components or a different ordering of components in other embodiments. The signal output by the stage 338 is sent to a lead of a DME/XPDR switch 344 that is used to select between the first (transponder) and second (DME) receivers. The second receiver is shown in a dashed box 346 and includes a mixer 348 that is driven by an oscillator 350. After the signal passes through the mixer 348, it next passes through one or more filtering and gain stages, such as a low pass filter 352 followed by a gain stage 354 and a bandpass filter 356 that is configured to accept DME reply frequencies. Next, the output signal of the box 346 is sent to another lead of the DME/XPDR switch 344.

After either the transponder (via the first receiver) or the DME (via the second receiver) signal passes through the switch 344, it next passes through an amplifier, such as a logarithmic amplifier 358. Next, the signal enters a logic circuit component 360. The first LRU 302 also includes a second TX/RX switch 362 that connects the first antenna 306 to either a third receiver or a transmission path. When the TX/RX switch 362 is switched to the third receiver side, a received signal passes through a preselector 364 that is a filter configured to accept transponder frequencies in an example embodiment. The signal then passes through a gain stage 366 that may be a low noise amplifier, for example. Next, the signal passes through a mixer 368 that is driven by the fixed oscillator 326. Then, the signal enters a filtering and amplification stage 370. In this example, the stage 370 includes a low pass filter 372 followed by a first gain stage 374 and a bandpass filter 376 that is configured to accept transponder frequencies. Next, the signal passes through a second gain stage 378 before passing through a second bandpass filter 380 that is also configured to accept transponder frequencies. Next, the signal passes through an amplification stage 382, such as a logarithmic amplifier, before entering the logic circuit component 360.

In an example embodiment, the logic circuit component 360 includes a DATA IN line and a DATA OUT line that are used to send control signals to and receive status signals from various components controlled by the logic circuit component 360. The DATA IN and DATA OUT lines are also used to communicate with other systems (not shown) in some embodiments. The logic circuit component 360 selectively configures the LRU 302 to function as a XPDR or a DME. It directs a modulator 384 to properly respond based on the selected configuration. The modulator 384 is in signal communication with a transmitter 386 that is selectively connected to either the first antenna 306 or the second antenna 310 through a top/bottom switch 388. The transmitter 386 is also in signal communication with the variable frequency oscillator 324, which is used to produce frequencies for responding to transponder interrogations as well as for initiating DME interrogations. Although the details are not shown for the second LRU 304, it should be understood that the second LRU 304 is configured similarly to the first LRU 302 in an example embodiment.

Although the connections are not shown, the logic circuit component 360 controls the first TX/RX switch 314, the second TX/RX switch 362, the top/bottom switch 388, the switch 322, and the switch 344 in an example embodiment. Additionally, the logic circuit component 360 controls the frequency of the variable frequency oscillator 324. In this way, the logic circuit component 360 determines whether transponder or DME signals are being transmitted and received, the proper antenna to use, the oscillator frequency received by the mixer 320, and whether to accept a received signal which passes through the components in the dashed box 338 or the dashed box 346.

In an example embodiment, each of the LRUs 302 and 304 are operable only as a DME or a XPDR at a given time and the LRU1/LRU2 switch 308 is controlled by a pilot or other user of the system 300 so that should one of the LRUs 302 or 304 fail, the pilot is able to switch to the other LRU. In an example embodiment, the pilot is also able to control whether the LRUs 302 and 304 function as a DME or a XPDR, such as by providing a control signal (not shown) to the logic circuit component 360 which then controls the switches 322 and 344 such that either DME or XPDR signals are properly received.

Figure 7:
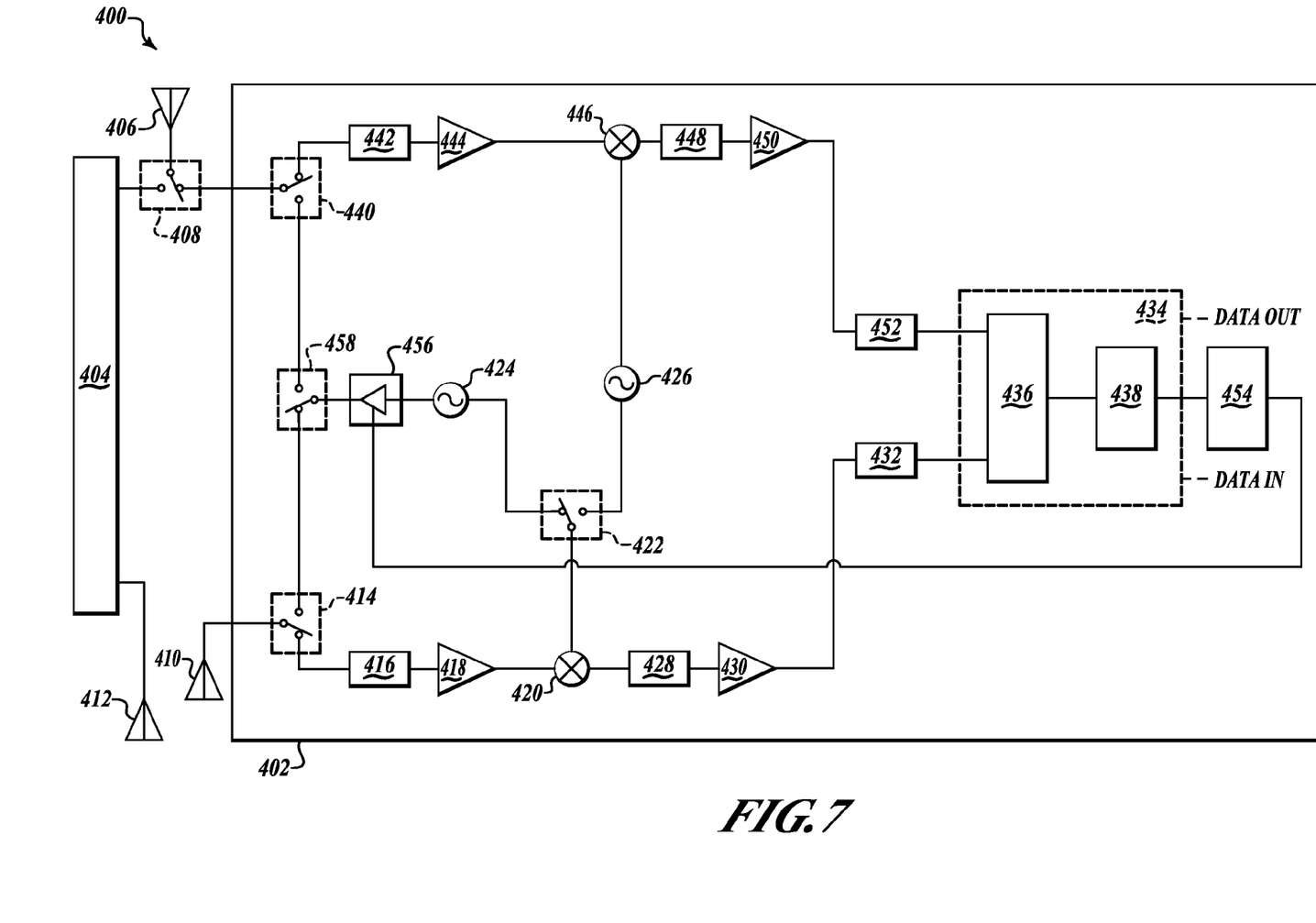
FIG. 7 is a block diagram showing additional detail for an embodiment of the invention corresponding to the transponder and DME system shown in FIG. 3 using a digital implementation.

FIG. 7 is a block diagram showing a combined transponder and DME system 400 formed in accordance with an example embodiment of the invention. The system 400 corresponds to a more detailed digital implementation of the system 90 shown in FIG. 3. The system 400 of FIG. 7 includes a first LRU 402 and a second LRU 404 that may be used in redundant operation. The system 400 also includes a first antenna 406 that is selectively connected to either the first LRU 402 or the second LRU 404 using an LRU1/LRU2 switch 408. Each LRU 402 and 404 is also connected to an additional antenna. The first LRU 402 connects to a second antenna 410 and the second LRU 404 connects to a third antenna 412. A signal received through the second antenna 410 first passes through a first TX/RX switch 414. The TX/RX switch 414 selectively connects the second antenna 410 to either a receiving or a transmitting path.

When the TX/RX switch 414 is switched to the receiving path, a received signal passes through a preselector 416 that is configured to pass both transponder and DME frequencies. The preselector 416 may be a bandpass filter, a low pass filter, or a specialized MEMS device, for example. Next, the signal passes through a gain stage 418, such as a low noise amplifier. Then, the signal passes through a mixer 420 that is in signal communication with a switch 422 that selectively connects the mixer 420 to either a variable frequency oscillator 424 or a fixed oscillator 426. The variable frequency oscillator 424 is generally used for DME reception and the fixed oscillator 426 is generally used for transponder signal reception. After passing through the mixer 420, the signal next passes through an anti-aliasing filter 428 before entering a gain stage 430 and then passing into an analog to digital converter 432 before entering a processing and control unit 434.

The processing and control unit 434 in this example includes an FPGA 436 as well as a logic circuit component 438. However, the FPGA 436 and the logic circuit component 438 may be formed of other components or may be consolidated into a single component as is known by those skilled in the field. For example, they may be combined into a high performance microprocessor, may include a specialized digital signal processor, or may be formed of a single FPGA, multiple FPGAs or an ASIC.

The first LRU 402 also includes a second TX/RX switch 440 that is used to selectively connect the first antenna 406 to either an additional receiving path or a transmission path. When the TX/RX switch 440 is connected to the receiving path, the signal passes through a preselector 442 that is configured to accept frequencies containing transponder interrogation signals. The signal then passes through a gain stage 444, such as a low noise amplifier. Next, the signal passes through a mixer 446 that is driven by the fixed oscillator 426 and then passes through an anti-aliasing filter 448 and a gain stage 450 before passing into a second analog to digital converter 452 and entering the processing and control unit 434.

The processing and control unit 434 verifies that transponder interrogations or DME reply signals have been received and generates signals that control the frequency of the variable frequency oscillator 424 and the positions of the first TX/RX switch 414 and the second TX/RX switch 440 based on the verification. The processing and control unit 434 also controls a modulator 454 by directing the modulator to generate appropriate transmission signals. The modulator 454 is in signal communication with a transmitter 456 that may be selectively coupled to either the first antenna 406 or the second antenna 410 using a top/bottom switch 458 whose position is also controlled by the processing and control unit 434. Although the details of the second LRU 404 are not shown, it should be understood that they are similar to the internal details shown for the first LRU 402 in an example embodiment.

In an example embodiment, the processing and control unit 434 includes a DATA IN line and a DATA OUT line that are used to send control signals to and receive status signals from various components controlled by the processing and control unit 434. The DATA IN and DATA OUT lines are also used to communicate with other systems (not shown) in some embodiments. Although the connections are not shown, the processing and control unit 434 controls the first TX/RX switch 414, the second TX/RX switch 440, and the top/bottom switch 458 in an example embodiment. Additionally, the processing and control unit 434 controls the frequency of the variable frequency oscillator 424 and the switch 422. In this way, the processing and control unit 434 determines whether transponder or DME signals are being transmitted and received, the proper antenna to use, and the oscillator frequency received by the mixer 420.

In an example embodiment, each of the LRUs 402 and 404 are operable only as a DME or a XPDR at a given time and the LRU1/LRU2 switch 408 is controlled by a pilot or other user of the system 400 so that should one of the LRUs 402 or 404 fail, the pilot is able to switch to the other LRU. In an example embodiment, the pilot is also able to control whether the LRUs 402 and 404 function as a DME or a XPDR, such as by providing a control signal (not shown) to the processing and control unit 434 which then controls the switch 422 such that either DME or XPDR signals are properly received.

While the preferred embodiment of the invention has been illustrated and described, as noted above, many changes can be made without departing from the spirit and scope of the invention. For example, filtering and amplification stages could be formed of alternative combinations of filters and gain stages. Additionally, other types of antennas than L-band blade antennas could be used. Also, aspects of an analog implementation could be used in a digital implementation and vice versa. Additionally, the systems and methods receive DME squitter signals as well as DME replies from ground stations in some embodiments. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A combined transponder (XPDR) and distance measuring equipment (DME) system for use in an aircraft comprising:
    a first antenna; and
    a combined transponder and DME transceiver component in signal communication with the first antenna.

2. The system of claim 1, further comprising a first switch, wherein the transceiver component comprises:
    a first combined transponder and DME transceiver unit; and
    a second combined transponder and DME transceiver unit,
    wherein the first switch is controllable to place either the first transceiver unit or the second transceiver unit in signal communication with the first antenna.

3. The system of claim 2, further comprising:
    a second antenna; and
    a second switch,
    wherein the second switch is controllable to place either the first transceiver unit or the second transceiver unit in signal communication with the second antenna.

4. The system of claim 2, further comprising:
    a second antenna; and
    a third antenna,
    wherein the second antenna is in signal communication with the first transceiver unit and the third antenna is in signal communication with the second transceiver unit.

5. The system of claim 3, wherein the first and second transceiver units include analog front end receiver components.

6. The system of claim 3, wherein the first and second transceiver units include digital front end receiver components.

7. The system of claim 1, wherein the transceiver component comprises:
    a transmitter;
    a modulator in signal communication with the transmitter;
    a first receiver;
    a switch that is controllable to place the transmitter or the first receiver in signal communication with the first antenna;
    a first mixer in signal communication with the first receiver;
    a variable frequency oscillator in signal communication with the transmitter and the first mixer; and
    a processing and control unit in signal communication with the switch, the variable frequency oscillator, the modulator, and the receiver.

8. The system of claim 7, further comprising:
    a second receiver;
    a second mixer in signal communication with the second receiver; and
    a fixed oscillator in signal communication with the second mixer,
    wherein the first receiver is configured according to DME signal frequencies and the second receiver is configured according to transponder interrogation frequency,
    wherein the switch is controllable to place the second receiver in signal communication with the first antenna.

9. The system of claim 8, further comprising:
    a second antenna;
    a third receiver configured according to transponder interrogation frequency;
    a second switch that is controllable to place the transmitter or the third receiver in signal communication with the second antenna; and
    a third mixer in signal communication with the third receiver and the fixed oscillator.

10. The system of claim 7, further comprising:
    a second receiver;
    a fixed oscillator;
    a second switch in signal communication with the variable frequency oscillator and the fixed oscillator,
    wherein the first receiver is configured according to DME signal frequencies and the second receiver is configured according to transponder interrogation frequency,
    wherein the first switch is controllable to place the second receiver in signal communication with the first antenna,
    wherein the second switch is controllable by the processing and control unit.

11. The system of claim 1, wherein the transceiver component includes a transmitter configured to transmit DME interrogation signals and XPDR reply signals.

12. A method of transmitting and receiving transponder and DME signals, the method comprising:
    receiving a transponder interrogation signal at a combined transponder and DME system on an aircraft;
    determining if the received transponder interrogation signal is valid at a processing component in the combined transponder and DME system;
    controlling a variable frequency oscillator with a controller to select a transponder transmission frequency if the transponder interrogation signal is valid based on a predefined protocol;
    transmitting a reply signal if the transponder interrogation signal is valid;
    controlling the variable frequency oscillator with the controller to select a DME transmission frequency;
    transmitting a DME interrogation signal; and
    receiving a DME reply.

13. The method of claim 12, wherein the transponder interrogation signal has a frequency of approximately 1030 MHz, the transponder reply signal has a frequency of approximately 1090 MHz, the DME interrogation signal uses frequencies in the range from 1025 to 1150 MHz, and the DME receive signal uses frequencies in the range from 962 to 1213 MHz.

14. The method of claim 12, further comprising receiving a DME squitter signal.

15. The method of claim 12, wherein the transponder reply signal is transmitted using a transmitter and the DME interrogation signal is transmitted using the same transmitter.

* * * * *